(12) United States Patent
James et al.

(10) Patent No.: US 8,391,126 B2
(45) Date of Patent: Mar. 5, 2013

(54) METHOD AND APPARATUS FOR PROVIDING ECHO CANCELLATION IN A NETWORK

(75) Inventors: James James, Farmingdale, NJ (US); David B. Ramsden, Wall, NJ (US); Wallace F. Smith, Sea Girt, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 564 days.

(21) Appl. No.: 12/641,185

(22) Filed: Dec. 17, 2009

(65) Prior Publication Data

US 2011/0149815 A1 Jun. 23, 2011

(51) Int. Cl.
*H04J 1/12* (2006.01)
(52) U.S. Cl. ............... 370/201; 370/269; 379/3
(58) Field of Classification Search .................. 370/201, 370/269; 379/3
See application file for complete search history.

(56) References Cited

U.S. PATENT DOCUMENTS

| | | | |
|---|---|---|---|
| 2001/0002903 A1* | 6/2001 | Chung | 370/286 |
| 2002/0076037 A1* | 6/2002 | Nishimura | 379/406.01 |
| 2003/0108094 A1* | 6/2003 | Lai et al. | 375/222 |
| 2005/0094803 A1* | 5/2005 | Watanabe | 379/406.01 |
| 2008/0226385 A1* | 9/2008 | Ruble | 402/75 |
| 2008/0304653 A1* | 12/2008 | Ghani et al. | 379/406.08 |
| 2009/0110185 A1* | 4/2009 | Yamamoto | 379/406.01 |
| 2010/0278056 A1* | 11/2010 | Meloche et al. | 370/252 |

* cited by examiner

*Primary Examiner* — Andrew Lee

(57) ABSTRACT

A method and apparatus for providing echo cancellation are disclosed. For example, the method receives via an echo canceller a first audio signal directed towards an endpoint device, and adds an inserted signal to the first audio signal directed towards the endpoint device. The method determines if a second audio signal being received from the endpoint device comprises the inserted signal, and cancels at least a portion of the second audio signal that is associated with the first audio signal, if the inserted signal is detected.

17 Claims, 4 Drawing Sheets

METHOD AND APPARATUS FOR PROVIDING ECHO CANCELLATION IN A NETWORK

The present disclosure relates generally to communication networks and, more particularly, to a method and apparatus for providing echo cancellation in a network, e.g., a wireless network, a packet network, an Internet Protocol (IP) based network, and the like.

BACKGROUND

In order to improve voice quality, the network service provider may implement echo cancellation technology throughout the network. For example, an echo may cause a speaker to hear the speaker's own voice after some delay. The service provider of the network may then implement an echo canceller that recognizes a transmitted signal when it is received on a return path after some delay, and applies a signal or other process to cancel or otherwise attenuate the echo signal received on the return path.

However, in order for the echo to be recognized, the echo has to be received within the operating range of the echo canceller. For example, the echo may be expected to be received within approximately 50 milliseconds. Unfortunately, the echo for a call over an IP or cellular network may reach the echo canceller with a delay that exceeds an operating range of the echo canceller. Moreover, the media path for the call may vary over time. For example, a speaker may change his/her physical location while talking. Hence, connection delays and variability of the media paths may exacerbate the problem of echo in networks. Consequently, customers may become dissatisfied with the quality of the voice service and the service provider may potentially lose a significant amount of the business.

SUMMARY

In one embodiment, the present disclosure discloses a method and apparatus for providing echo cancellation. For example, the method receives via an echo canceller a first audio signal directed towards an endpoint device, and adds an inserted signal to the first audio signal directed towards the endpoint device. The method determines if a second audio signal being received from the endpoint device comprises the inserted signal, and cancels at least a portion of the second audio signal that is associated with the first audio signal, if the inserted signal is detected.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus for providing echo cancellation in a network. Although the present disclosure is discussed below in the context of Internet Protocol (IP) protocol based and wireless network based voice services, the present disclosure is not so limited. Namely, the present disclosure can be applied to any network that would benefit from echo cancellation, e.g., any network with a transmission delay.

Figure 1:
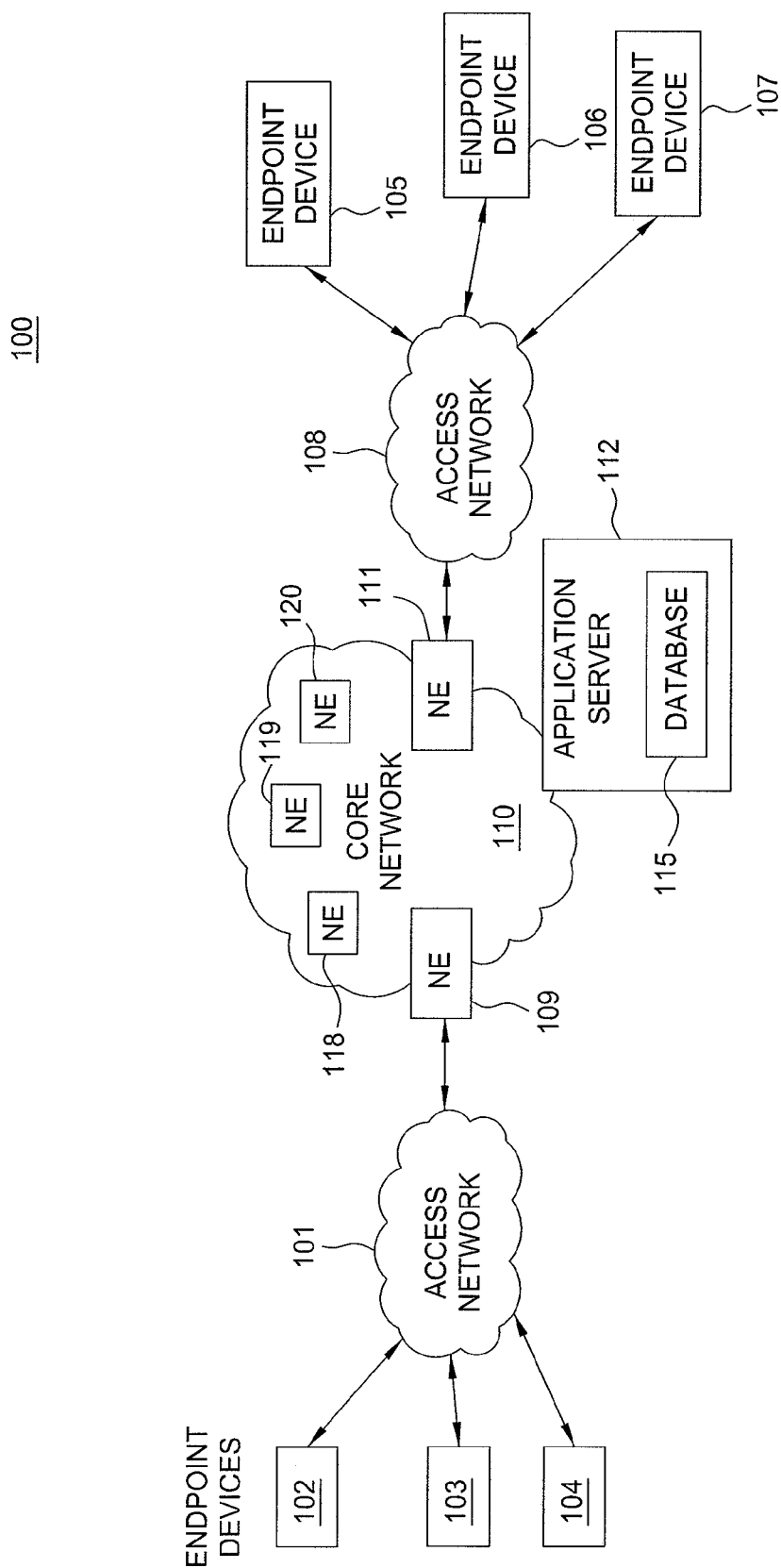
FIG. 1 illustrates an illustrative architecture for accessing a network service.

FIG. 1 illustrates an exemplary network 100 for accessing a network service related to the present disclosure. Exemplary networks include packet networks, Internet protocol (IP) networks, Internet Protocol (IP) Multimedia Subsystem (IMS) networks, wireless networks, Public Switched Telephone Networks (PSTN), various access networks, and the like.

In one embodiment, the network may comprise a plurality of endpoint devices 102-104 configured for communication with the core network 110 (e.g., an IP based core backbone network such as Internet Protocol (IP) Multimedia Subsystem (IMS) network and the like, supported by a service provider) via an access network 101. Similarly, a plurality of endpoint devices 105-107 are configured for communication with the core network 110 via an access network 108. The network elements 109 and 111 may serve as gateway devices, e.g. servers or edge routers for the core network 110.

The endpoint devices 102-107 may comprise customer endpoint devices such as personal computers, laptop computers, Personal Digital Assistants (PDAs), servers, routers, wire-based phones, wireless phones, cellular phones, smart phones, and the like.

The access networks 101 and 108 serve as a conduit to establish a connection between the endpoint devices 102-107 and the NEs 109 and 111 of the core network 110. The access networks 101 and 108 may each comprise a Digital Subscriber Line (DSL) network, a broadband cable access network, a Local Area Network (LAN), a wireless local area network (WLAN), a Wireless Access Network (WAN), a cellular network, a $3^{rd}$ party network, and the like. The access networks 101 and 108 may be either directly connected to NEs 109 and 111 of the core network 110, or indirectly through another network.

Some NEs (e.g., NEs 109 and 111) reside at the edge of the core infrastructure and interface with customer endpoints over various types of access networks. An NE that resides at the edge of a core infrastructure is typically implemented as an edge router, a media gateway, a border element, a firewall, a switch, and the like. An NE may also reside within the network (e.g., NEs 118-120) and may be used as a mail server, a router, or like device. The core network 110 also comprises an application server 112 that contains a database 115. The application server 112 may comprise any server or computer that is well known in the art, and the database 115 may be any type of electronic collection of data that is also well known in the art. It should be noted that although only six endpoint devices, two access networks, five network elements, and one application server are depicted in FIG. 1, the communication network 100 may be expanded by including additional endpoint devices, access networks, network elements, and application servers without altering the scope of the present disclosure.

The above communication network is described to provide an illustrative environment in which packets for various services are transmitted on networks. In one embodiment, a service provider may wish to enable customers (broadly users) to access services over a variety of networks. For example, a network service provider may provide voice services over a cellular network, an Internet Protocol (IP) based network (e.g., Voice over Internet Protocol), a Public Switched Telephone Network (PSTN), etc. In order to improve voice quality, the network service provider may implement echo cancellers in the network. For example, an echo may cause a speaker to hear the speaker's own voice after some delay. The service provider may then implement echo cancellers that recognize a transmitted signal when it is received on a return path after some delay, and apply a signal or other process to cancel the signal received on the return path (i.e., the echo of the transmitted signal). However, in order for the echo to be recognized, the echo has to be received within the operating range of the echo canceller. For example, the echo may be expected to be received within approximately 30 milliseconds, 50 milliseconds, etc.

However, a call over a cellular network or an IP network may have a significantly longer connection time as compared to a call over a PSTN. In turn, the echo for a call over an IP network or a cellular network may reach the echo canceller with a delay that may exceed the operating range of the echo canceller. The effect is that the echo will not be properly addressed by the echo canceller. In addition, the media path for the call may vary over time, e.g., a cellular call may be transferred from one cell tower to another cell tower as the user travels from one cell area to another cell area. For example, a speaker may change his/her physical location while talking on a cell phone or any other wireless customer endpoint device. Hence, the path of the echo changes as the media path changes. For example, a customer may be in a moving vehicle continuously altering the media path, and consequently the echo path. The inclusion of wireless and IP networks for voice services and the increased mobility of users have exacerbated the problem of echo in networks.

In one embodiment, the current disclosure provides a method and apparatus for providing echo cancellation in a network. Specifically, the method enables echo cancellers to identify and cancel echoes, regardless of the delay in receiving the echoes. Furthermore, the method enables echo cancellers to identify echoes that may include distortion due to the variability of media path.

In one embodiment, the method first detects an audio signal (also referred to as a speech signal or a voice signal) directed towards a particular endpoint device. The method then adds a distinctive feature (broadly an inserted signal) to the audio signal transmitted to the particular endpoint device. The distinctive feature is a signal that is normally not found in an audio signal that comprises only speech, i.e., a human voice. The distinctive feature enables the echo canceller to search for the distinctive feature on a return path from the particular endpoint device. For example, the echo canceller may search for the distinctive feature in the audio signal being received on the return path.

In one embodiment, the distinctive feature is a low frequency signal, e.g., a signal in a frequency spectrum of 20 Hz-40 Hz, which is a non-audible spectrum for humans. Although, the teachings below are described using a 20 Hz-40 Hz signal, any signal that is outside the audible, or at least annoying, range for humans may be used. A non-annoying audible signal may be deduced from a survey of individuals or any known signal that users are known to find acceptable in a phone call. The echo canceller may then search for the low frequency signal in the return path. If the received audio signal on the return path does not contain the low frequency signal, the audio signal on the return path is classified as speech or broadly a legitimate audio signal and allowed to pass through the echo canceller.

In one embodiment, if the received audio signal on the return path contains the distinctive low frequency signal, the audio signal on the return path is classified as echo and canceled. For example, the echo canceller may add a signal that cancels (i.e., eliminates) the echo, or reduces the energy associated with the echo.

In one embodiment, the current method determines if the received audio signal contains both echo and speech by comparing a signal level of the received audio with an expected signal level for an echo. For example, an expected signal level for the echo may be established by performing signal level comparisons between a transmitted signal and its echo, and establishing a nominal level for the echo. The premise is that if a speech signal overlaps the echo, then the received signal level would likely then be significantly higher than what would be expected based only on the determined nominal level. For example, if the nominal signal level of the echo for a voice signal transmitted from speaker A to speaker B is 5-10% of the level of the signal transmitted to speaker B, receiving an audio that has a signal level at 75-80% of the transmitted signal would indicate that the audio signal comprises speech from speaker B. Thus, if the low frequency signal added by the echo canceller is detected on the return path, but the signal level is significantly higher than the nominal level that was previously determined, then the echo canceller will conclude the audio signal comprises both echo and a new speech signal.

In one embodiment, if the audio signal on the return path contains both the echo signal and the new speech signal, the present method will cancel the echo signal, i.e., canceling only a portion of the audio signal (the echo signal portion) on the return path. For example, the echo canceller may employ one or more adaptive filters. Using the above example, the speech signal from speaker A to speaker B may be temporarily or momentarily stored by the echo canceller. If the audio signal on the return path within the operating time frame of the echo canceller detects the distinctive feature, and both echo signal plus a new speech signal (e.g., speech signal from speaker B to speaker A), then the echo canceller will cancel or filter the audio signal to only remove the echo signal. This will allow the speech signal from speaker B to speaker A to pass to speaker A.

In one embodiment, the current method may also use the above distinctive feature to predict a delay for an echo, e.g., when the echo is to be expected. In other words, the prediction can be based on an analysis as to the measured delay in detecting the distinctive feature on the return path. For example, an echo canceller may have an adaptive filter that performs the echo cancellation in a time window identified by predicting a delay for the echo. For example, if the echo canceller has an operating range of 50 milliseconds but the predicted time for receiving the echo is approximately 100 milliseconds, then the echo canceller has a higher probability of successfully locating and canceling the echo if it delays the beginning of the search, e.g., start the search after 75 milliseconds.

The ability to predict when the echo may occur enables the echo canceller to be designed with lower processing requirements and improved speed of convergence. For example, an echo canceller with an operating range of 50 milliseconds with a delay prediction capability as discussed above can still be effectively employed for calls over IP and cellular networks.

Figure 2:
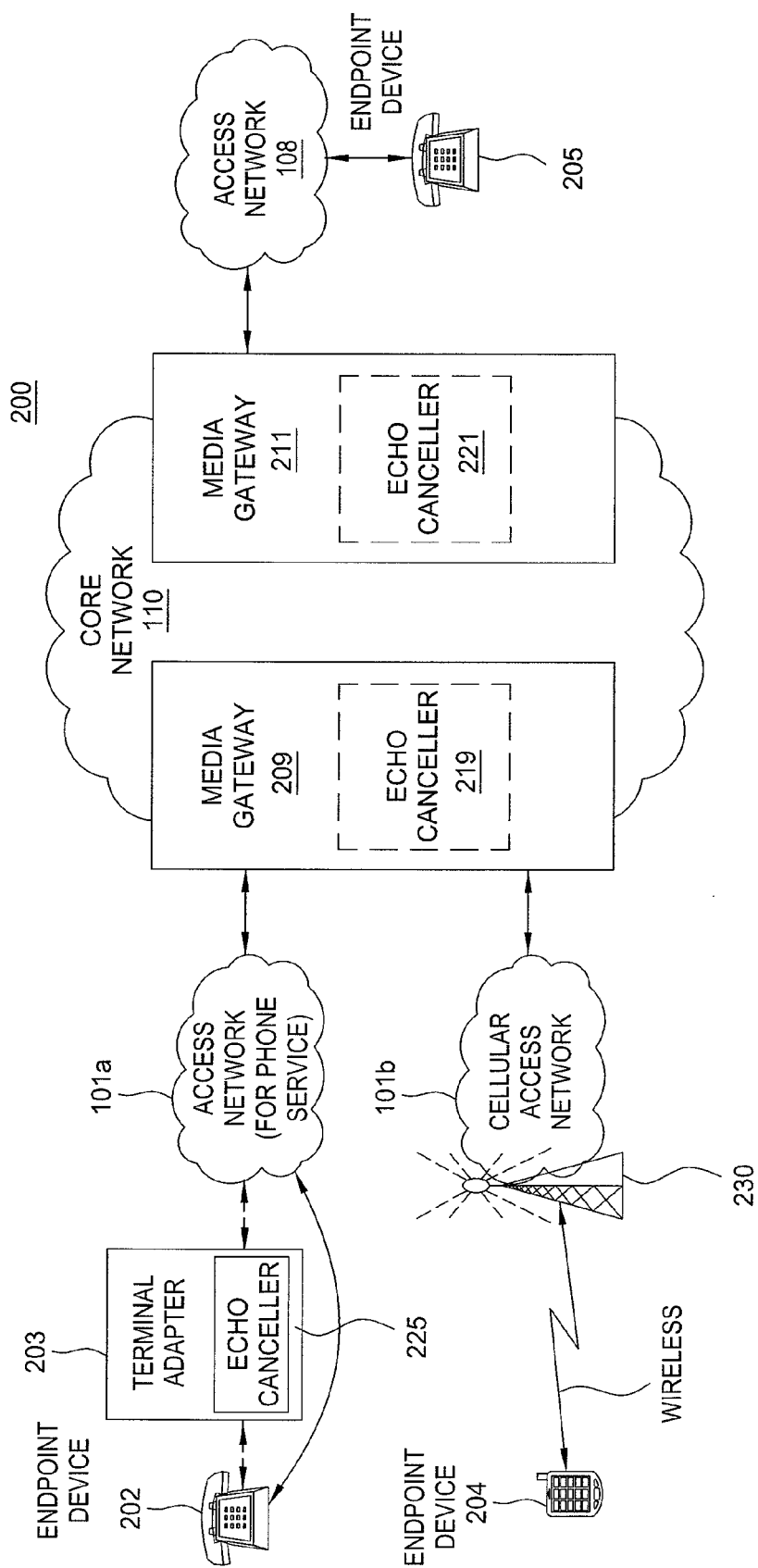
FIG. 2 illustrates an exemplary network for providing echo cancellation in a network.

FIG. 2 illustrates an exemplary network 200 for providing echo cancellation in a network. In one embodiment, the network 200 comprises endpoint devices 202, 204 and 205 communicating with the core network 110. For example, the endpoint device 202 communicates with the core network 110 via an access network 101a (e.g., for IP services) and a media gateway 209. The endpoint device 202 reaches the access network 101a either directly or via a terminal adapter 203 (e.g., deployed at a customer premise location). The endpoint device 204 communicates with the core network 110 via a cellular access network 101b and the media gateway 209. For example, the endpoint device 204 reaches the cellular access network 101b via a base station 230. Finally, the endpoint device 205 communicates with the core network 110 via an access network 108 and a media gateway 211.

In one embodiment, the network service provider implements the method for providing echo cancellation in media gateways and terminal adapters. For example, the network service provider implements echo cancellers 219, 221 and 225 in media gateway 209, media gateway 211 and terminal adapter 203, respectively. It should be noted that the deployment of the cancellers as shown in network 200 is only illustrative. As such, the present echo cancellation method can be adapted to other areas or components of network 200.

In one embodiment, the echo canceller 219 adds a distinctive feature to the audio signal transmitted to the endpoint device 204. The echo canceller 221 adds a distinctive feature to the audio signal transmitted to the endpoint device 205. If the endpoint device 202 is communicating with the access network 101a without the use of the terminal adapter 203, the echo canceller 219 adds a distinctive feature to the audio signal transmitted to the endpoint device 202. If the endpoint device 202 is communicating with the access network 101a via the terminal adapter 203, the echo canceller 225 may add a distinctive feature to the audio signal transmitted to the endpoint device 202.

The echo canceller that added the distinctive feature to an audio path transmitted to a particular endpoint may then search for the distinctive feature in the audio signal being received on a return path from that particular endpoint. For example, the echo canceller 221 searches for the distinctive feature in the audio signal being received from endpoint 205. If the received audio signal on the return path from endpoint 205 does not contain the distinctive feature (e.g., a particular low frequency signal), the audio signal on the return path is classified as speech and allowed to pass through the echo canceller 221 towards its destination. However, if the received audio signal on the return path from endpoint 205 contains the distinctive feature, the audio signal on the return path is classified as echo and canceled. For example, the echo canceller 221 may add a signal that cancels (e.g., eliminates) the echo from endpoint 205.

In one embodiment, the echo canceller 221 also determines if the audio signal received on the return path from endpoint 205 contains an echo in conjunction with a speech signal from the user of the endpoint 205 (e.g., voice of the user of the phone 205). In one embodiment, if the audio comprises both speech and echo, the current method allows the audio to pass through the echo canceller 221.

Similarly, the echo canceller 225 searches for the distinctive feature in the audio signal being received from the endpoint device 202, and the echo canceller 219 searches for the distinctive feature in the audio signal received form the endpoint 204 and the endpoint 202, if applicable. Although the illustrative example implements the echo canceller of the current method in a terminal adapter or a media gateway, it is important to note that the method can be implemented in other network devices, e.g., routers, switches, and the like, and in other customer premise devices.

Figure 3:
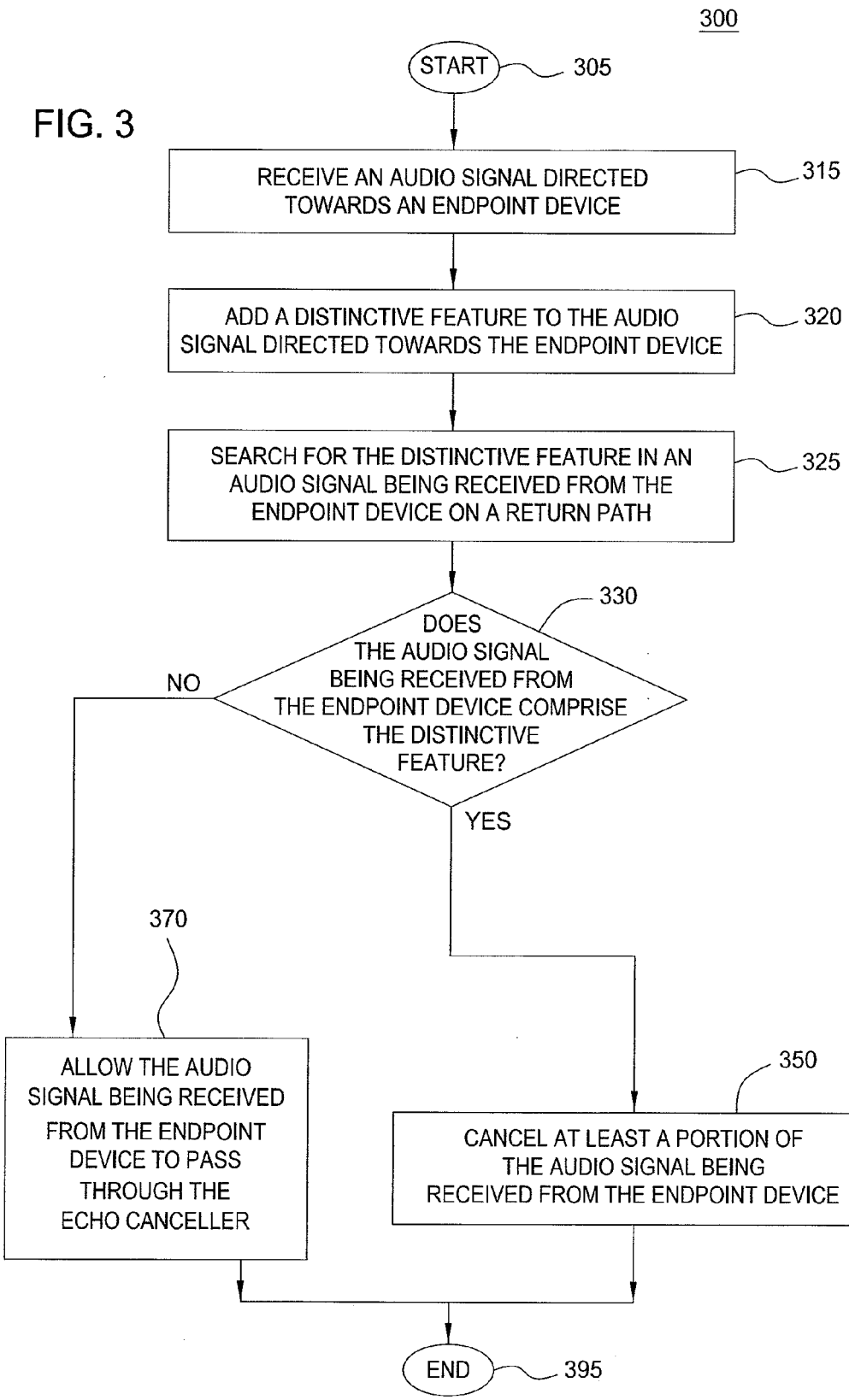
FIG. 3 illustrates a flowchart of a method for providing echo cancellation in a network.

FIG. 3 illustrates a flowchart of a method 300 for providing echo cancellation in a network. For example, one or more steps of method 300 can be implemented in an echo canceller. It is important to note that the echo canceller may be implemented in a router, terminal adapter, or like network device or like customer premise device. Method 300 starts in step 305 and proceeds to step 315.

In step 315, method 300 receives an audio signal directed towards an endpoint device. For example, an echo canceller receives an audio signal that comprises a speech signal directed to a particular endpoint device.

In step 320, method 300 adds a distinctive feature to the audio signal directed towards the endpoint device. For example, the method adds a low frequency signal (non-audible for humans) to the signal being transmitted towards the endpoint device.

In step 325, method 300 searches for the distinctive feature in an audio signal being received from the endpoint device on a return path. For example, the echo canceller searches for the low frequency signal on the media path being used for transmission from the endpoint device towards the echo canceller.

In step 330, method 300 determines if the audio signal being received from the endpoint device comprises the distinctive feature. For example, the echo canceller determines if the low frequency signal is detected on the media path being used for transmission from the endpoint device towards the echo canceller. If the audio signal being received from the endpoint device comprises the distinctive feature, the method proceeds to step 350. Otherwise the method proceeds to step 370.

In step 350, method 300 cancels at least a portion of the audio signal being received from the endpoint device. For example, the echo canceller may add a signal that cancels (e.g., eliminates, or attenuates) the echo from endpoint device. It should be noted that "cancelling" may broadly include attenuating the echo to an acceptable level without having to completely eliminate the echo. The method then proceeds to step 395 to end processing the current audio signal or returns to step 315 to continue receiving more audio signals.

In step 370, method 300 allows the audio signal being received from the endpoint device to pass through the echo canceller. For example, the echo canceller lets the audio signal to proceed towards its destination without being canceled. The method then proceeds to step 395 to end processing the current audio signal or returns to step 315 to continue receiving more audio signals.

It should be noted that although not specifically specified, one or more steps of method 300 may include a storing, displaying and/or outputting step as required for a particular application. In other words, any data, records, fields, and/or intermediate results discussed in the method 300 can be stored, displayed and/or outputted to another device as required for a particular application. Furthermore, steps or blocks in FIG. 3 that recite a determining operation, or involve a decision, do not necessarily require that both branches of the determining operation be practiced. In other words, one of the branches of the determining operation can be deemed as an optional step.

Figure 4:
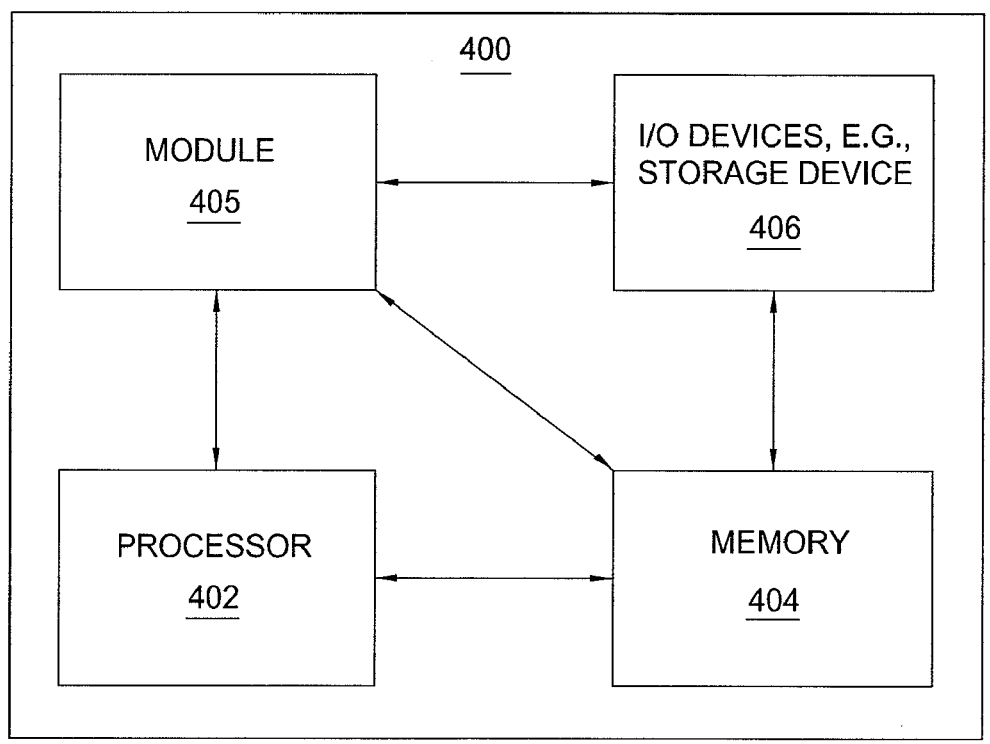
FIG. 4 illustrates a high-level block diagram of a general purpose computer suitable for use in performing the functions described herein.

FIG. 4 depicts a high level block diagram of a general purpose computing device suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing echo cancellation in a network, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)). Thus, system 400 may broadly represent a mobile endpoint device or a network element such as a call control element.

It should be noted that the present disclosure can be implemented in software and/or in a combination of software and hardware, e.g., using application specific integrated circuits (ASIC), a general purpose computer or any other hardware equivalents. In one embodiment, the present module or process 405 for providing echo cancellation in a network can be loaded into memory 404 and executed by processor 402 to implement the functions as discussed above. As such, the present process 405 for providing echo cancellation in a network (including associated data structures) of the present disclosure can be stored on a computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing echo cancellation, comprising:
   receiving, by a processor of an echo canceller, a first audio signal directed towards an endpoint device;
   adding, by the processor, an inserted signal to the first audio signal directed towards the endpoint device;
   determining, by the processor, if a second audio signal received from the endpoint device comprises the inserted signal, wherein the determining further comprises determining if the second audio signal comprises a speech signal by comparing a signal level of the second audio signal received from the endpoint device with an expected signal level for an echo from the endpoint device; and
   canceling, by the processor, a portion of the second audio signal that is associated with the first audio signal, if the inserted signal is detected.

2. The method of claim 1, wherein the inserted signal comprises a low frequency signal, wherein the low frequency signal is a signal in a non-audible spectrum for humans.

3. The method of claim 1, wherein the inserted signal comprises a signal that is deemed to be non-annoying for humans.

4. The method of claim 1, wherein a delay for the echo is predicted based on the inserted signal.

5. The method of claim 4, wherein the echo canceller performs an echo cancellation function within a time window that is associated with the delay.

6. The method of claim 1, wherein the echo canceller is implemented within a media gateway deployed within a network.

7. The method of claim 1, wherein the echo canceller is implemented within a terminal adapter.

8. A tangible computer-readable storage medium having stored thereon a plurality of instructions which, when executed by a processor of an echo canceller, cause the processor to perform operations for providing echo cancellation, the operations comprising:
   receiving by the echo canceller a first audio signal directed towards an endpoint device;
   adding an inserted signal to the first audio signal directed towards the endpoint device;
   determining if a second audio signal received from the endpoint device comprises the inserted signal, wherein the determining further comprises determining if the second audio signal comprises a speech signal by comparing a signal level of the second audio signal received from the endpoint device with an expected signal level for an echo from the endpoint device; and
   canceling a portion of the second audio signal that is associated with the first audio signal, if the inserted signal is detected.

9. The tangible computer-readable storage medium of claim 8, wherein the inserted signal comprises a low frequency signal, wherein the low frequency signal is a signal in a non-audible spectrum for humans.

10. The tangible computer-readable storage medium of claim 8, wherein the inserted signal comprises a signal that is deemed to be non-annoying for humans.

11. The tangible computer-readable storage medium of claim 8, wherein a delay for the echo is predicted based on the inserted signal.

12. The tangible computer-readable storage medium of claim 11, wherein the echo canceltler performs an echo cancellation function within a time window that is associated with the delay.

13. The tangible computer-readable storage medium of claim 9, wherein the echo canceller is implemented within a media gateway deployed within a network.

14. The tangible computer-readable storage medium of claim 8, wherein the echo canceller is implemented within a terminal adapter.

15. An apparatus for providing echo cancellation, comprising:
   a processor of an echo canceller; and
   a computer-readable medium in communication with the processor, to store a plurality of instructions which, when executed by the processor, cause the processor to perform operations, the operations comprising:
      receiving a first audio signal directed towards an endpoint device;
      adding an inserted signal to the first audio signal directed towards the endpoint device;
      determining if a second audio signal received from the endpoint device comprises the inserted signal, wherein the determining further determines if the second audio signal comprises a speech signal by comparing a signal level of the second audio signal received from the endpoint device with an expected signal level for an echo from the endpoint device; and
      canceling a portion of the second audio signal that is associated with the first audio signal, if the inserted signal is detected.

16. The apparatus of claim 15, wherein the inserted signal comprises a low frequency signal, wherein the low frequency signal is a signal in a non-audible spectrum for humans.

17. The apparatus of claim 15, wherein a delay for the echo is predicted based on the inserted signal.

* * * * *